United States Patent
Garcia

(10) Patent No.: US 8,366,549 B2
(45) Date of Patent: Feb. 5, 2013

(54) CONTROLLER

(76) Inventor: Ernesto Garcia, Alexandria, VA (US)

( * ) Notice: Subject to any disclaimer, the term of this patent is extended or adjusted under 35 U.S.C. 154(b) by 98 days.

(21) Appl. No.: 13/049,639

(22) Filed: Mar. 16, 2011

(65) Prior Publication Data

US 2012/0021834 A1 Jan. 26, 2012

(30) Foreign Application Priority Data

Jul. 20, 2010 (SG) .................................. 2010053023

(51) Int. Cl.
*G06F 17/00* (2006.01)

(52) U.S. Cl. ............................................. 463/38

(58) Field of Classification Search .............. 463/36–38; 345/156, 157, 161
See application file for complete search history.

(56) References Cited

U.S. PATENT DOCUMENTS

| | | | |
|---|---|---|---|
| 5,223,776 A * | 6/1993 | Radke et al. ............... | 318/568.1 |
| 6,614,420 B1 | 9/2003 | Han et al. | |
| 2008/0214306 A1 | 9/2008 | Ludden | |
| 2011/0080563 A1* | 4/2011 | Greaves et al. ............... | 352/243 |
| 2012/0081670 A1* | 4/2012 | Greaves et al. ............... | 352/243 |
| 2012/0106941 A1* | 5/2012 | Greaves et al. ............... | 396/421 |

FOREIGN PATENT DOCUMENTS

| | | |
|---|---|---|
| JP | 7-116351 A | 5/1995 |
| JP | 8-103567 A | 4/1996 |
| WO | 9924965 A1 | 5/1999 |
| WO | 2005103869 A2 | 11/2005 |

\* cited by examiner

*Primary Examiner* — Ronald Laneau

(57) ABSTRACT

A controller (1) converts physical movement in eight directions of motion into electrical signals. The controller (1) has two opposed handles (2a, 2b) connected together using a gimbal (150) having a telescoping device (200) that is rotatable relative to the gimbal (150). The telescoping device (200) has an inner member (18) that is biased in either telescoping direction using one spring. The inner member (18) can be locked along either of the telescoping directions using a locking device (26). The gimbal (150) has four sensors sensing movement of one handle (2a) relative to the other handle (2b).

31 Claims, 7 Drawing Sheets

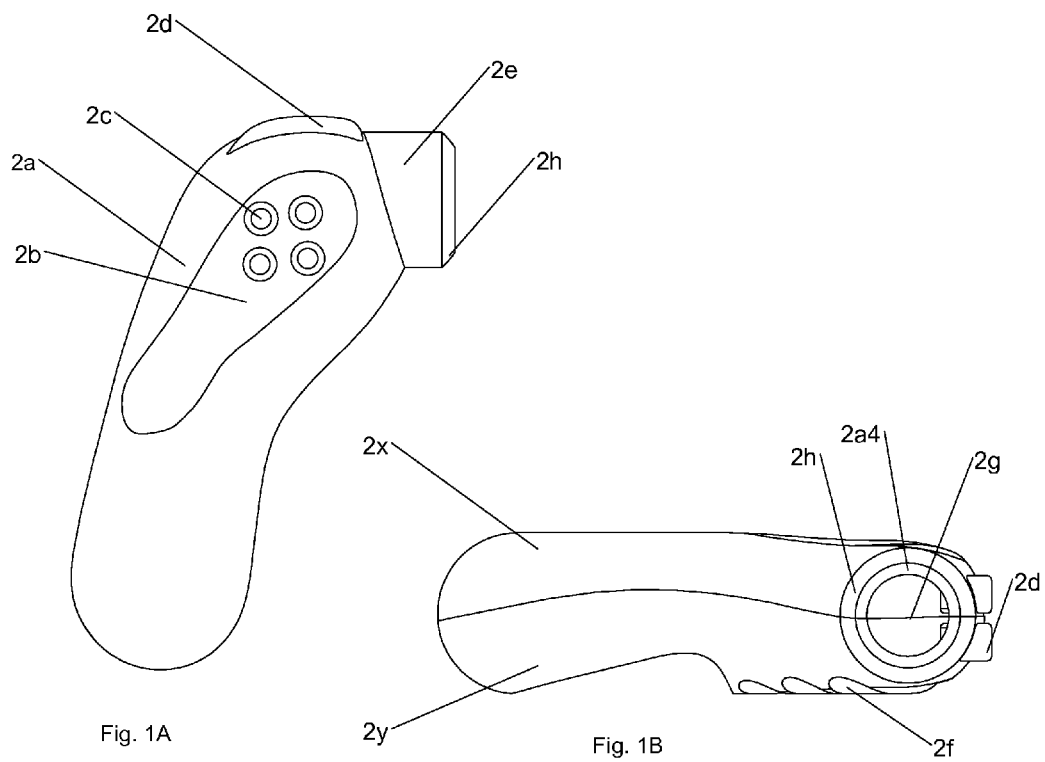
Fig. 1A
Fig. 1B
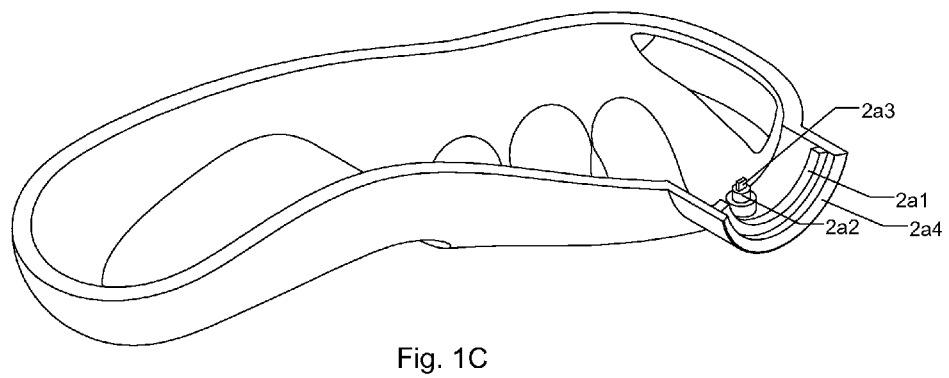
Fig. 1C

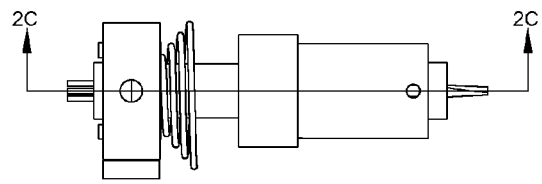
Fig. 2B
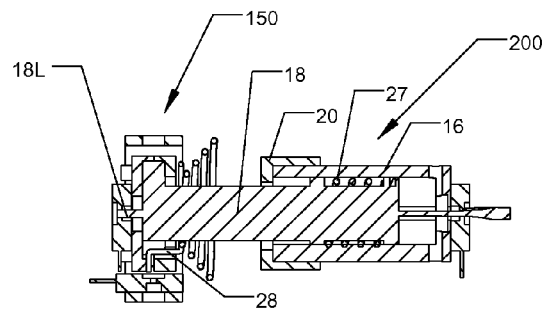
Fig. 2C
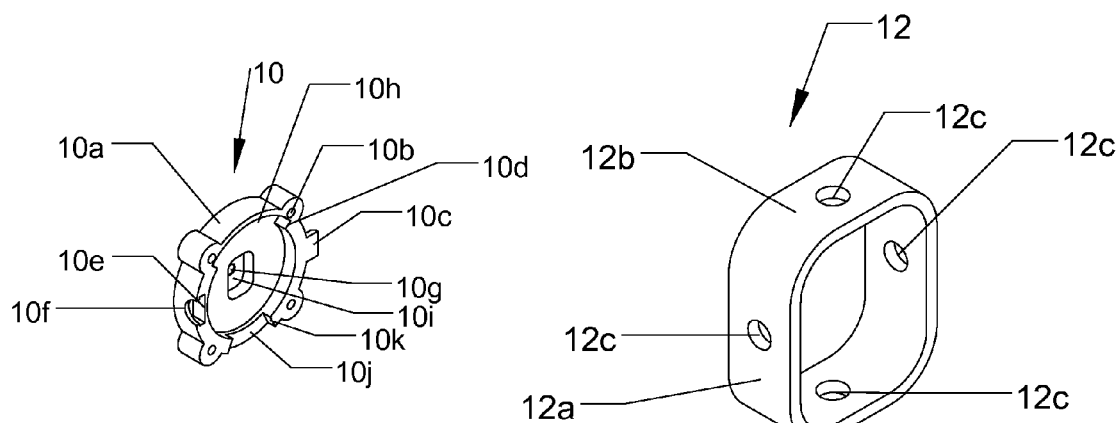
Fig. 3
Fig. 4

CONTROLLER

FIELD

The present invention relates to a controller, particularly though not solely to a game controller.

BACKGROUND

A joypad is a prior art game controller commonly used in video games. The joypad uses two thumb sticks to manipulate the position and spatial view of a gamer during video gaming. Thus the joypad's accuracy may be determined by thumb dexterity. The thumbs sticks may be difficult and cumbersome to use for someone new to controlling a physical device or a computer-simulated device requiring navigation.

Many new gamers or experienced gamers may find themselves not knowing their location or may loose control of their screen position during game play. The use of thumbs may provide accurate positioning after great amounts of practice to locate a moving target or coordinate. Misuse of the thumb control may cause simulator sickness or motion sickness thus causing headaches or tunnel vision. This may be caused by the improper control of the thumb sticks not coordinating with brain activity.

International Patent publication number WO2005103869 discloses a game controller with two handles connected by a ball joint.

SUMMARY OF THE INVENTION

In general terms the present invention provides a controller with a more intuitive control of desired actions. The controller has a coupling mechanism which provides up to eight directions of motion while providing accurate manipulation of a physical device or a computer simulated device using both hands. This may have the advantage of improved positional accuracy and reduced simulation sickness.

The controller may sense the relative movement of one handle relative to another handle with up to eight directions of motion.

The controller may control movement of a physical device or a virtual device within a computer environment. The controller may have four sensors each having two directions of motion for detecting movement. The controller may have two handles, each handle being gripped by a user's hand. The handles may be connected by a gimbal and a telescoping device. The gimbal may provide four directions of motion and the telescoping device (also being rotatable relative to the gimbal) providing another four directions of motion.

The gimbal may provide pivotable motion of one handle relative to the other similar to that of a universal joint. The telescoping device allows one handle to be translatable relative to the other handle and the telescoping device becomes rotatable relative to the gimbal providing rotation of the other handle relative to the telescoping axis while one of the two handles becomes fixed. Thus the combination of the gimbal and the telescopic device may give six directions of relative rotatable motion similar to that of a ball joint, with the addition of two directions of relative translation motion.

The handles may be symmetrical and have a shape similar to a foot silhouette or tear drop. One of the handles may contain a ball socket while the other handle contains a section of a ball portion that correspond to the ball socket to simulate a ball joint. A resilient member may be between the handles to hide the telescoping device and simulated ball joint.

The telescoping device may have a lock to prevent the telescoping device from being operated.

Each handle may include a thumb cavity where buttons, a D-pad, or any other controller module may be installed or projected. Each of the handles may be provided with additional trigger buttons for the index fingers.

The controller may be applicable to video games, simulation, artillery, robotics, any form of vehicle, or combinations thereof.

In a first specific expression of the invention there is provided a controller as claimed in claim 1 or claim 25.

BRIEF DESCRIPTION OF THE DRAWINGS

In order that the invention may be fully understood and readily put into practical effect there shall now be described by way of non-limitative example only, example embodiments described below with reference to the accompanying illustrative drawings in which:

FIG. 1A shows a top view of the left handle of the controller.

FIG. 1B shows a right side view of the left handle of the controller.

FIG. 1C shows an isometric view of the bottom shell of left handle.

FIG. 2B shows a top view of FIG. 2A.

FIG. 2C shows a cross-sectional vie of FIG. 2B.

FIG. 3 shows an isometric view of a first cover of the gimbal.

FIG. 4 shows an outer frame of the gimbal.

DETAILED DESCRIPTION

A controller 1 according to the first example embodiment pertains to spatial control of at least one physical device or at least one computer simulated device. The controller communicates with a computer and converts physical movement into electrical signals providing control of the physical device or the computer-simulated device. The controller allows a user to steer, fly, or move in three dimensions.

Figure 18A:
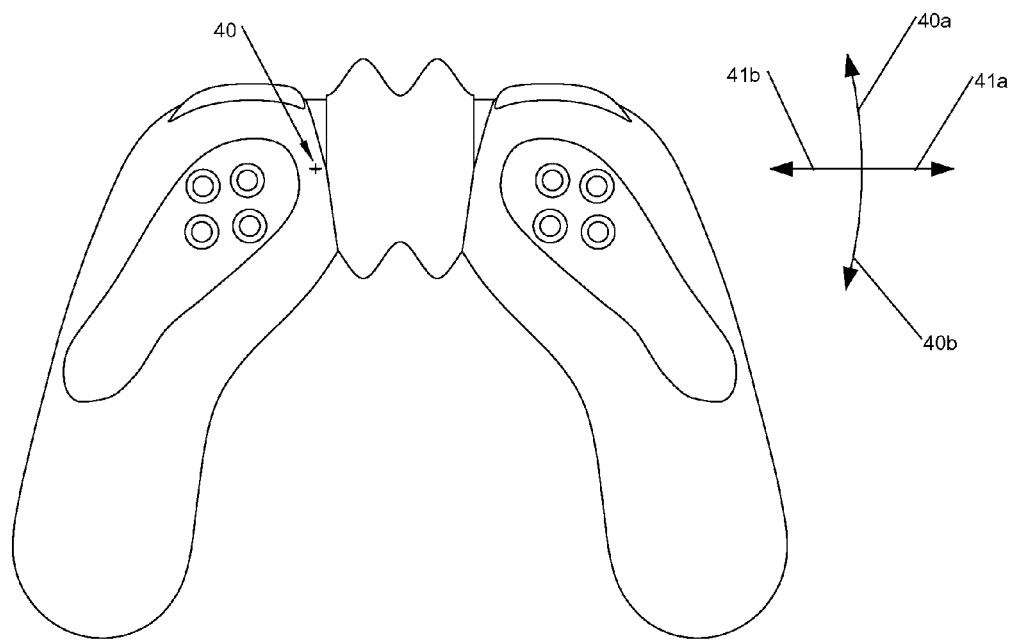
FIGS. 18a-18c show the movements of the right handle relative to the left handle.

For example FIG. 18a shows the controller 1 having a left handle or first handle 2a, a right handle or second handle 2b, and a resilient member 1a. The handles 2a, 2b are shaped to be comfortable for the user to hold, for example a foot silhouette or tear drop shape.

Figure 18B:
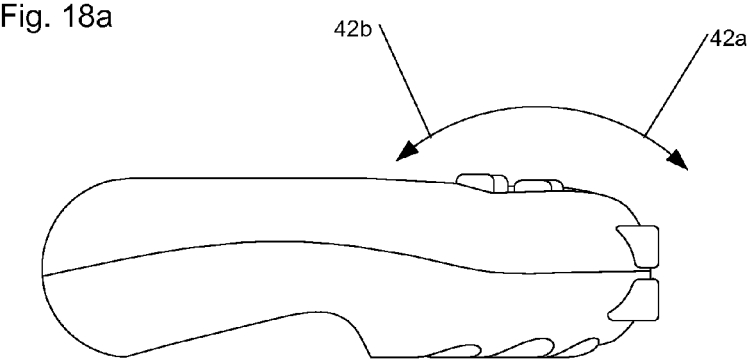
Figure 18C:
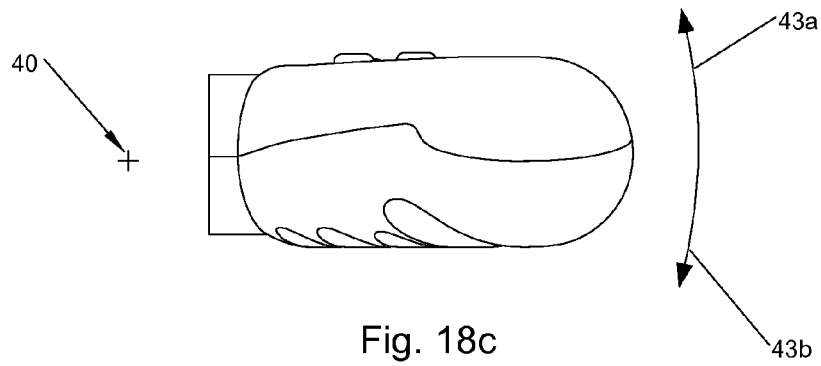

The controller 1 includes a number of sensors to detect the movement of the first handle 2a relative to the second handle 2b. As seen in FIGS. 18a-18c eight directions of motion or 4 degrees of freedom are able to be detected. In FIG. 18a, a counter clockwise movement 40a and clockwise movement 40b of the right handle relative to fixed point 40 are the first and second directions of motion, or first degree of freedom. This is detected by sensor 6d in FIG. 2a as is described later. In FIG. 18c, an upward movement 43a and a downward movement 43b, corresponding to counter clockwise movement and clockwise movement of the right handle relative to the fixed point 40, are the third and forth directions of motion, or second degree of freedom. This counter clockwise and clockwise movements 43a, 43b, are detected by sensor 6c in FIG. 2a as is described later. In FIG. 18a, right movement 41a and left movement 41b of the right handle, relative to the fixed point 40, are the fifth and sixth directions of motion, or third degree of freedom. This is detected by sensor 6a in FIG. 2a as is described later. In FIG. 18b, a clockwise movement 42a and a counter clockwise movement 42b are the seventh and eighth directions of motion, or fourth degree of freedom. This is detected by sensor 6b in FIG. 2a as is described later.

The resilient member 1a is interposed between the handles 2a, 2b so that when the right handle 2b moves towards the left handle 2a debris is avoided from entering the handles. It is contemplated that the resilient member 1a is a booth or a sealing bellows which provides a biasing force when retracted. The resilient member 1a is attached between the handles in any form as well known to those in connecting booth or resilient bellows. In particular, ends of the resilient member 1a can be snapped into corresponding grooves and held in place with snap rings or held in placed by capping halves of the shells forming the handles.

FIG. 1A shows the left handle 2a having a thumb cavity 2b, at least four buttons 2c, two trigger buttons 2d, as seen in better view in FIG. 1B, and a ball portion 2h. The location of the at least four buttons 2c is contemplated to be at the thumb cavity 2b. The ball portion 2h forms part of a ball joint and extends from a projection 2e attached to the handle. The projection 2e is not necessary thus the ball portion 2h can simply be directly joined to the left handle 2a. The handle 2a is made of a top shell 2x and a bottom shell 2y. The bottom shell 2y is composed of three cavities 2f to conform to three fingers.

The bottom shell 2y houses electric circuitry 3 containing the communication module to interface with a computer. The commutation module may be wireless or wired. The electric circuitry 3 to the controller may be battery operated. For instance, a battery pack can be installed to the top shell of either or both of the handles 2a, 2b. The bottom shell 2y further contains a spring blocker 2a1, a pivot projection 2a2. The spring blocker 2a1 acts as a stopper to a conical spring 9, shown in FIG. 2, for the spring 9 to rest on. The spring blocker 2a1 of the top shell 2x, when in combination with another spring blocker 2a1 of the bottom shell 2y, house the spring 9. A key 2a3 projects from the pivot projection 2a2 which serves to rotate a fourth potentiometer 6d shown in FIG. 2A and mounted to the outer frame 12. The fourth potentiometer 6d is controlled by the pivotal motions 40a, 40b, as shown in FIG. 18a, to control either yaw, roll, steering, or camera view. For instance, the pivotal motions 40a, 40b of the handle would respectively control right and left sight in a shooter game, control yaw in a flying object, or steering of a car. Although, not shown, the upper shell 2x contains a similar spring blocker 2a1 and a similar pivot projection 2a2 without the key 2a3 as shown in the lower shell 2y. The bottom shell 2y further comprises a conical opening 2a4 containing part of the telescoping device 200 as shown in FIG. 1C.

Figure 1D:
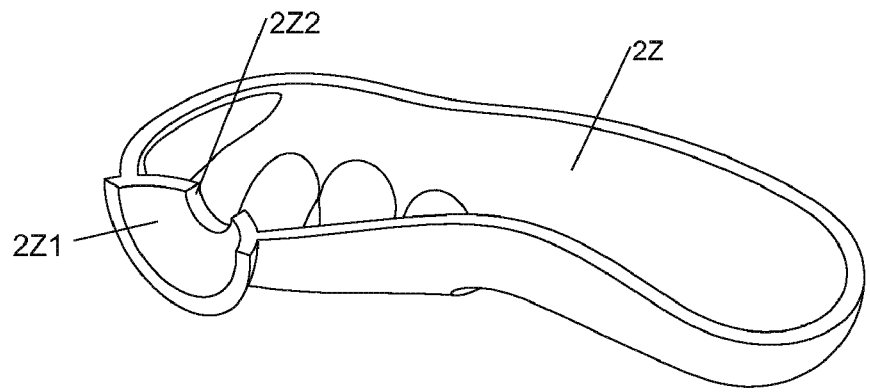
FIG. 1D shows an isometric view of the bottom shell of the right handle.

FIG. 1D shows an isometric view of a bottom shell 2z of the right handle 2b. The bottom shell 2z contains a portion of a ball socket 2Z1. The ball socket 2Z1 is shown in half so that when a mirror image rests on top the two halves form a 360 degree ball socket to mate with the ball portion 2h. The radius of curvature of the ball socket and the ball portion is made relative to the centre of the pivot projection 2a2. A recess 2z2 is provided at a quadrant of the ball socket 2z1. Although not shown, a locking projection may be included in the bottom shell 2z to retain the telescoping device.

Figure 2:
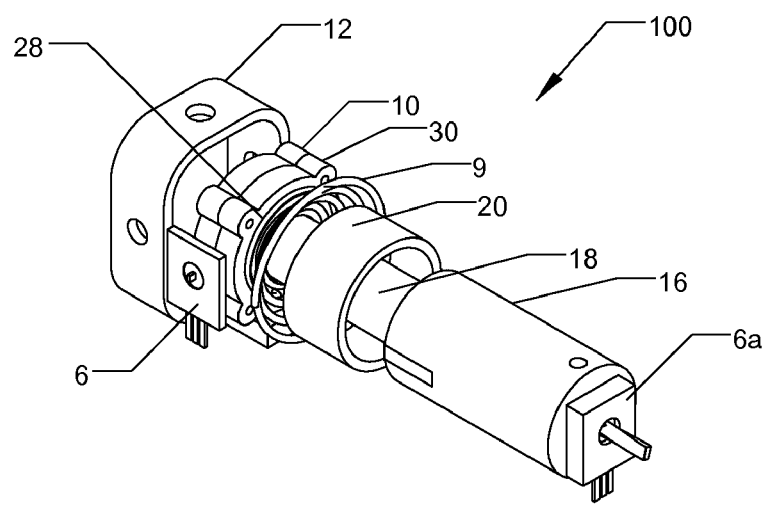
FIG. 2 shows an isometric view of the gimbal and the telescoping device.
Figure 2A:
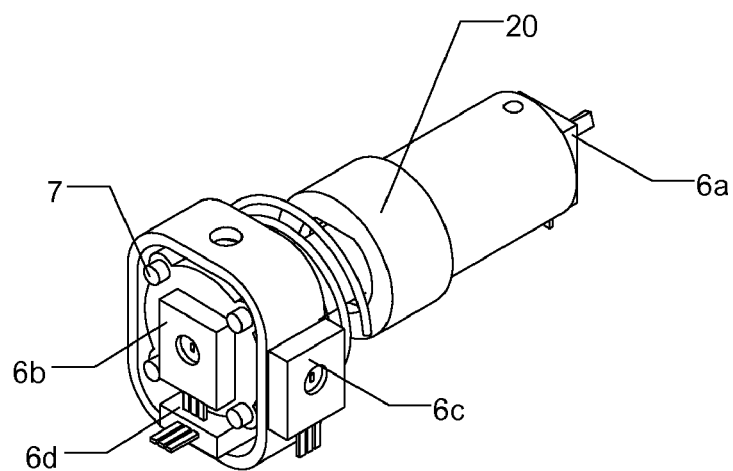
FIG. 2A shows a back view of the isometric view shown in FIG. 2.
Figure 5:
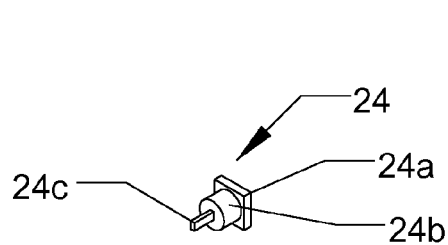
FIG. 5 shows an isometric view of the anti-rotation stud.
Figure 6:
FIG. 6 shows an isometric back view of the second cover of the gimbal.
Figure 7:
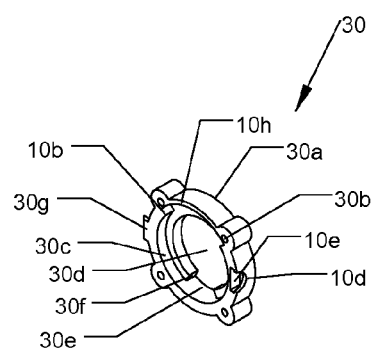
FIG. 7 shows an isometric front view of the second cover.
Figure 8:
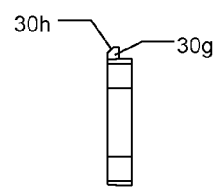
FIG. 8 shows a side view of the second cover.
Figure 9:
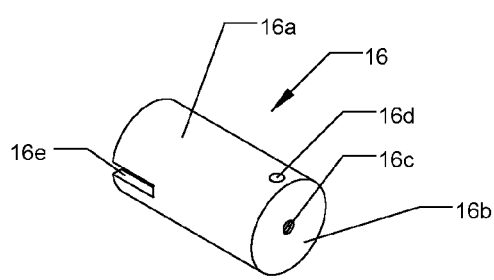
FIG. 9 shows an isometric view of the outer member of the telescoping device.
Figure 10:
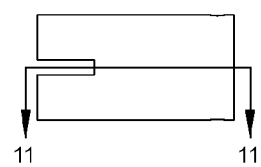
FIG. 10 shows a front view of the outer member shown in FIG. 9.
Figure 11:
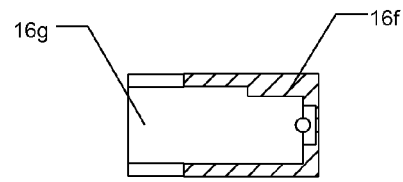
FIG. 11 shows a cross-sectional view 11-11 of the outer member of the telescoping device shown in FIG. 10.
Figure 12:
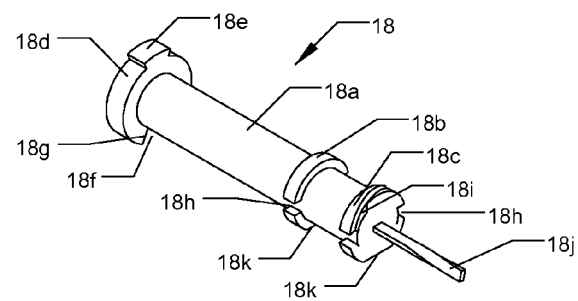
FIG. 12 shows an isometric view of the inner member of the telescoping device.

FIGS. 2, 2a, 2b, and 2c show the coupling mechanism 100 including a gimbal 150 and a telescoping device 200. The gimbal 150 is made of an outer frame 12 and an inner frame comprising two half covers 10, 30 joined together to form the inner frame that is rotatable relative to the outer frame 12. The inner frame is joined to the outer frame 12 by two half cylinders 10c, 30g and an anti-rotation stud 24. The outer frame 12 is in this exemplary view as being rectangular with walls 12a, 12b however other shapes are contemplated. The outer frame 12 contains two pairs of opposed openings 12c that allow the outer frame 12 to pivot relative to the left handle 12a and respectively allow the pivot projections 2a2 of the upper and lower shells of the left handle to be inserted. One of the pairs of opposed openings allow the inner member of the gimbal to rotate relative to the outer frame 12. The anti-rotation stud 24 is embedded between the two half covers 10, 30 comprising the inner member of the gimbal. The anti-rotation stud 24 shown in FIG. 5 comprises a non-circular portion 24a and a circular portion 24b. A key 24c projects from the circular portion 24b to rotate a third potentiometer 6c mounted to the outer frame 12 as seen in FIG. 2A. The third potentiometer 6c is controlled by the pivotal motions 43a, 43b of the right handle relative to the left handle at fixed point 40. The pivotal motions 43a, 43b can represent roll or yaw. It is contemplated that the pivotal motions 43a, 43b can respectively represent left movement and right movement of a player in a video game, steering of a vehicle, or controlling left and right camera view or camera sight.

The first half cover 10 and the second half cover 30 comprise the inner member and are joined to each other using any fastener 7 as illustrated in FIG. 2A. The first half cover 10 as seen in FIG. 3 comprises a body 10a having several openings 10b for insertion of the fastener 7. These openings 10b can be threaded or non-threaded. The first half cover 10 further includes a half cylindrical projection 10c forming a pivot. The first half cover 10 further includes an anti-rotation cavity 10e that correspond to half the shape of the non-circular portion 24b of the anti-rotation stud 24. The anti-rotation cavity 10e blends with a circular cavity 10f corresponding to half the shape of the circular portion of the anti-rotation stud 24. The first half cover 10 further comprises a shallow circular opening 10h delimited by two opposed limiters 10d for setting forth a range of motion of the telescoping device 200. The first half cover 10 further includes a wall 10i having a through opening 10g. The wall 10i supports a second potentiometer 6b as seen in FIG. 2A. The first half cover 10 further includes a radial arcuate opening 10j to allow end portions of a leaf spring 28 to extend thus retaining the leaf spring in place. The first half cover 10 includes end walls 10k forming the arcuate opening 10j.

The second half cover 30 of the inner frame contains similar features as those found in the first half cover 10, as seen in FIG. 3. The second half cover 30 similarly contains a body 30a, several fastener openings 30b, a shallow circular opening 10h delimited by two opposed limiters 10d for setting forth the same range of motion of the telescoping device 200. The cover 30 further includes the same anti-rotation cavity 10e that corresponds to half the shape of the non-circular portion 24b of the anti-rotation stud 24. The anti-rotation cavity 10e blends with a circular cavity 10f corresponding to half the shape of the circular portion of the anti-rotation stud 24. The cover 30 further includes a rotating cavity 30c and a through opening 30d in the body 30a. A spring delimiter opening 30e extends from one side of the body to the rotating cavity 30c which contains two opposed delimiters 30f which act as stoppers for the leaf spring 28. The cover 30 contains a half cylindrical projection 30g that acts as a pivot in conjunction with the half cylindrical projection 10c of the first cover 10. The half cylindrical projection 30g contains a flat sector 30h extending at an angle relative to the longitudinal axis of the cylindrical projection 30h to allow ease of insertion of the second cover into one of the pivot holes 12c of the outer frame 12.

The telescoping device 200 comprises an outer member 16 and an inner member 18 telescoping inside the outer member 16. The outer member 16 comprises a body 16a having a cylindrical shape. One end of the body 16a has a wall 16b, an axial opening 16g allowing the inner member 18 to slide therein.

Figure 17:
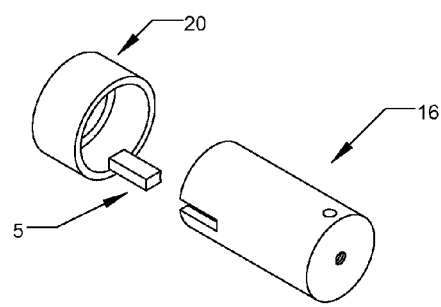
FIG. 17 shows an exploded view of a cap, a spring blocker and an outer member of a telescoping device.

The wall 16b contains an opening 16c to allow a twisted key 18j of the inner member 18 to pass through and engage a first potentiometer 6a to control forward motion or backward motion of a player in a video game when the inner member 18 telescopes in either left or right movements 41a, 41b, as seen in FIG. 18a, relative to the outer member 16. These left and right movements 41a, 41b, alternatively, can be reconfigured to control up and down motion of an object, to control throttle of a helicopter or any flying machine, or acceleration of a car. The movements 41a, 41b were intuitively associated, for instance, to forward and backward motion of a player as a way to provide exercise or therapy to a user of the controller. The outer member 16 further contains at least one axial slot 16e along a quadrant of the cylindrical body 16a to receive a spring pusher 5 to be encapsulated by a cap 20 as shown in FIG. 17. The body 16a further contains a retaining opening 16d which prevents the outer member 16 from sliding or turning once fixed to the right handle. The axial opening 16g contains a spring pusher 16f integral with the cylindrical body 16a. It is contemplated that the spring pusher 16f can be separated from the body 16a.

The inner member 18 comprises a shaft 18a, an annular flange 18d, a first retaining flange 18b, a second retaining flange 18c spaced along the shaft 18a, and a twisted key 18j. The annular flange 18d contains a stopper 18e projecting from the annular flange 18d and an arcuate slot 18f opposite the stopper 18e. The flange 18d is sandwiched between the first cover 10 and the second cover 30 thus allowing the flange 18d to rotate therein within any desired range. A spring 27 is interposed between the first retaining flange 18b and the second retaining flange 18c. It is envisioned that the spring 27 is inserted between the retaining flanges 18b, 18c using the spiral groove 18i which connects into the space between the retaining flanges 18b, 18c. Each of the retaining flanges 18b, 18c contains a d-flat 18k for preventing the inner member 18 from rotating relative to the outer member 16. The d-flats 18k cooperate with a d-flat 16h on the outer member 16 so that when the right handle is rotated or twisted along the telescoping axis, the telescoping member rotates relative to the gimbal 150 causing a second potentiometer 6b to rotate and registering counter clockwise or clockwise movements 42a, 42b, as seen in FIG. 18b, and respectively representing up and down sight in a shooter game or driving game, or representing pitch to control a helicopter or airplane. A key 18L projects from one end of the inner member 18 of the telescoping device engaging the second potentiometer 6b, as seen in FIG. 2C.

Figure 15:
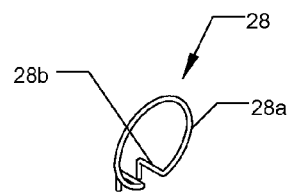
FIG. 15 shows an isometric view of the leaf spring.
Figure 16:
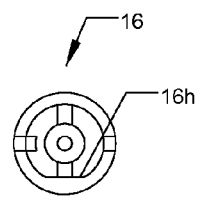
FIG. 16 shows a front view of the outer member of the telescoping device.

The leaf spring 28, shown in FIG. 15, comprises a cylindrical loop 28a terminating at each end with a hook projection 28b. The hook projection 28b becomes sandwiched between the two half covers 10, 30 which allow the inner member of the telescoping member to be biased to a neutral location. When the telescoping device 200 rotates in one direction, one of the hook projections 28b disengages from one of the delimiters 30f while the other hook projection 28b engages with the spring carrier 18g to flex the spring 28.

The description contemplates that the coupling device 100 is interposed between the two handles such that the gimbal 150 is pivotally fixed to the left handle, or vice versa, and the telescoping device 200 is fixed to the other corresponding handle.

Figure 19:
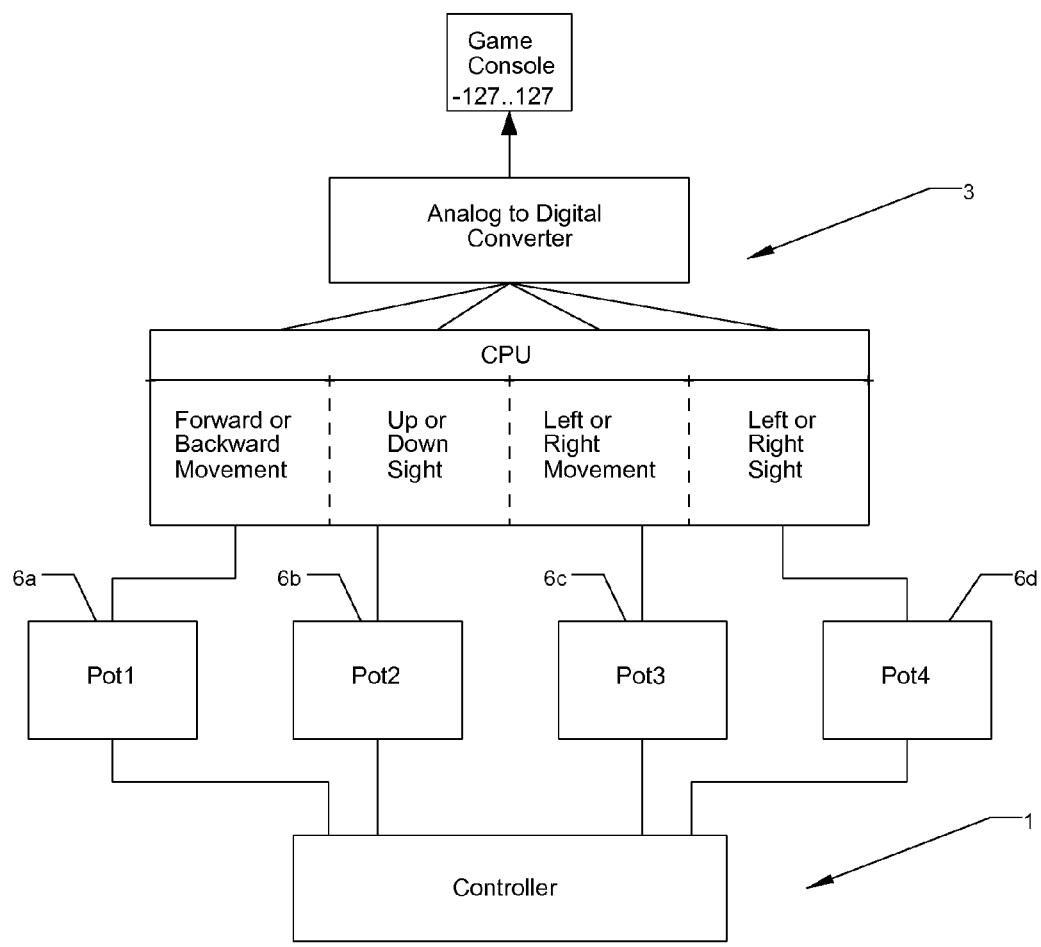
FIG. 19 shows an schematic showing a set up of control.

The electronics shown FIG. 19 inject a set current into the potentiometers 6a-6b and convert the resulting analogue voltage into digital signals, representing sight, motion or both. These may be converted according to a standard compatible with a game console or computer which processes the digital signals to thereby control the motion or sight of a virtual character. The game console or computer then generates a video signal to allow the virtual character to be dynamically shown on a display.

The invention contemplates using potentiometers having a corresponding key as those found in the coupling device 100 or of any other lock engagement shape. The buttons can be electronically reconfigured to do any number of actions such as jumping, crouching, flying, zooming a viewer's sight, etc. Also, more buttons than those shown can be implemented.

Numerous modifications can be made to the controller, depending on the application. For instance, the resilient member 1a, interposed between the handles 2a, 2b, can be avoided. The resilient member 1a can also take any resilient shape. While FIGS. 2, 2a, provides for the controller without a locking device for locking the position of the telescoping device 200, an embodiment can be construed with a locking device. The handles 2a, 2b each can have more than one cavity 2f to conform to at least one finger except the thumb. The non-circular portion 24a of the anti-rotation stud 24 although shown being rectangular can take any shape that prevents rotation. The quantity of the spring pushers 16f, 5 can be more than one and be respectively integral or separated from the outer member of the telescoping member and cap, and fit in axial slots 18h in the retaining flanges 18c, 18b. The leaf spring 28 that biases the rotatable telescoping device 200 can be of any other form as long as the telescoping device 200 retracts to a neutral position. The spring 28 can simply be replaced with two springs and be embedded between the first half cover 10 and the second half cover 30 instead of being outside the inner member of the telescoping device. It should also be noted that the drawings are not drawn to scale and dimensional extents of every individual component can simply be modified to be extended or shortened. Further, all of the components can be simply made from any known material. The resilient member 1a although being made of rubber can simply be made of any other known resilient material. The anti-rotation stud 24 although being separate from the first half cover 10 and the second half cover 30 can be integral with either half cover or shared between the half covers. The potentiometers 6a-6d can be respectively mounted via any known method or housed in corresponding mounting cavities. The shape of the outer member 16 can be of any other shape than cylindrical.

The coupling mechanism 100 can also be envisioned into one distinct unit such that the left handle can simply be replaced with any form of housing and entirely avoiding the left handle. This modification simply will allow one to place the unit attached between two separate handles where the housing becomes mounted to one handle and the telescoping device becomes mounted to a second handle.

The electronics and corresponding software may be used to calibrate the controller. Each of the potentiometers 6a-6d can be configured to electrically convert motion such that at least one of the potentiometers converts motion from a neutral position into forward motion when the potentiometer rotates clockwise or when the potentiometer rotates counter clockwise into backward motion, or vice versa, preferably caused by the telescoping device 200. The potentiometers 6 can be substituted for other sensors. Although a neutral position is envisioned as ordinary controllers, the electronics and corresponding software can be reconfigured to reverse motion instantly. The range of travel of the potentiometers may be from 0-60 degrees, or the range can be extended to its full 360 degrees of travel or to any desired range. Further, the coupling mechanism 100 can be reversed so that the gimbal is rather mounted to the right handle. The ball socket and the ball portion can also be reversed. The opening 2g in which the inner member 18 comes out of the first handle 2a, although being shown circular, the opening 2g can simply have any other shape such as rectangular, square, or triangular.

Figure 13:
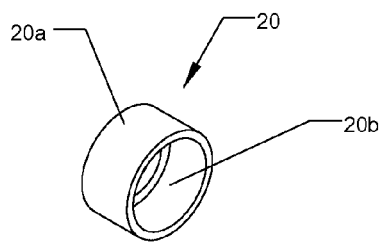
FIG. 13 shows an isometric view of a cap.
Figure 14:
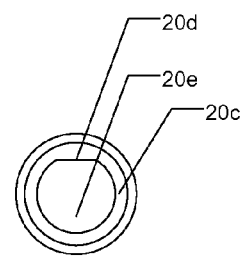
FIG. 14 shows a front view of the cap shown in FIG. 13.

The cap 20 although contemplated to be joined to the outer member 16 by threading, the joining can be by snap fitting, friction fitting, gluing, welding or fastening using screws, bolts, or rivets to provide a fixed joint. As shown in FIGS. 13 and 14, the cap 20 inherently includes a cylindrical wall 20a, an opening 20b, and a cover 20c having an opening 20e with a d-flat 20d. The opening 20e corresponds in shape to the first retaining flange 18b and the second retaining flange 18c.

Further, the use of the twisted portion to translate telescoping motion to rotational motion can be replaced with a linear potentiometer so that when the handles telescope, motion is registered using the linear potentiometer. Further, the telescoping device can be in the right handle, or in the left handle such that a shaft projects onto the right handle and be fixedly connected to the right handle. It is also contemplated that the spring 27 that is mounted between the two flanges of the inner member 18 can be avoided to provide a longer range of travel thus avoiding a neutral position. Although not shown, the right handle can be joined to the telescoping device via a ball joint connection, a constant velocity joint, or a pivot extending perpendicular to the longitudinal axis of the right handle.

It will be understood by those skilled in the technology that many variations in design, construction or operation may be made without departing from scope as claimed.

The invention claimed is:

1. A controller comprising:
   a first handle,
   a second handle, and
   a gimbal and a telescoping device mounted to the gimbal; the telescoping device being fixed to the first handle or the second handle and the gimbal being pivotally fixed to the other handle wherein the gimbal and the telescoping device couple the first handle and the second handle.

2. The controller of claim 1, wherein the gimbal sets forth a first pivotal axis and a second pivotal axis perpendicular to each other, and in a neutral position the telescoping device projects perpendicular to the first pivotal axis and the second pivotal axis along a third axis.

3. The controller of claim 2, wherein at least a portion of the telescoping device is rotatable about the third axis.

4. The controller of claim 3, wherein the gimbal comprises an outer frame rotatably mounted to the first handle and an inner frame rotatably mounted to the outer frame.

5. The controller of claim 4, wherein the telescoping device comprises an outer member, an inner member slidable through an axial opening of the telescoping outer member, and a cap having a through opening through which the telescoping outer member passes.

6. The controller of claim 5, further comprising a first sensor configured to detect bi-rotatable motion about the first axis, a second sensor configured to detects bi-rotatable motion about the second axis, and a third sensor and a fourth sensor configured to detect bi-rotatable motions about the third axis.

7. The controller of claim 5, where the telescoping outer member extends through an opening in the first handle.

8. The controller of claim 6, wherein the gimbal inner frame comprises a first half cover and a second half cover; the telescoping inner member mounted between the first half cover and the second half cover, the gimbal inner frame further having a stopper to limit rotational motion of the telescoping inner member.

9. The controller of claim 6, wherein the telescoping inner member comprises a twisted portion along the third axis and engages with the fourth sensor.

10. The controller of claim 5, wherein the telescoping inner member comprises a first retaining flange and a second retaining flange spaced apart, and a coil spring between the first retaining flange and the second retaining flange; the telescoping outer member having at least one spring pusher extending along a longitudinal axis of the axial opening of the outer member; the first annular flange comprises at least one slot to interact with the at least one spring pusher and to bias the coil spring; and the telescoping device further comprising at least one more spring pusher engaging an axial slot of the telescoping outer member to bias the coil spring in an opposite direction of the telescoping inner member.

11. The controller of claim 10, wherein the telescoping outer member further comprises a d-flat extending along the longitudinal axis of the telescoping outer member, the d-flat interacts with a d-flat in each the first retaining flange and the second retaining flange.

12. The controller of claim 6, wherein the first handle further comprises a pivot projection extending along the first pivotal axis of the gimbal outer frame; and the pivot projection includes a key engaging the first sensor mounted on the gimbal outer frame.

13. The controller of claim 6, wherein the gimbal inner frame comprises a key interacting with the second sensor mounted on the gimbal outer frame.

14. The controller of claim 6, wherein the telescoping inner frame further comprises an end portion having a key projecting axially along the third axis and interacting with the third sensor mounted on the gimbal inner frame.

15. The controller of claim 4, further comprising at least one spring blocker and a spring abutting the gimbal inner frame to bias the gimbal to a neutral position.

16. The controller of claim 8, wherein the telescoping device is biased by a leaf spring mounted to the gimbal inner member; and at least one of the first half cover and the second half cover comprise at least one arcuate limiter setting forth a range of travel of the leaf spring.

17. The controller of claim 1, wherein the first handle further comprises a ball portion and the second handle further comprises a ball socket, or vice versa, to mate with the ball portion.

18. The controller of claim 17, in which a resilient member is connected between the first handle and the second handle.

19. The controller of claim 18, in which the resilient member covers the ball socket, the ball portion, the gimbal and the telescoping device.

20. The controller of claim 5, wherein the second handle comprises at least one locking projection retaining the telescoping outer member.

21. The controller of claim 7, in which the opening of the first handle is conical or rectangular.

22. The controller of claim 1, further comprising electric circuitry, a communication module and an energy source.

23. The controller of claim 1, in which the first handle and the second handle each contains a thumb cavity containing four or more push buttons or sensors and at least one index trigger.

24. The controller of claim 15, in which the second handle is connected to the outer member of the telescoping device by a constant velocity joint, a ball joint, or a pivot joint extending perpendicular to a longitudinal axis of the second handle.

25. A controller comprising:
a first handle configured to be held by a user;
a mechanical coupling between the first handle and a reference point configured to limit pivoting motion of the first handle in first and second degrees of freedom, translational motion of the first handle in a third degree of freedom and rotating motion of the at least one handle in a fourth degree of freedom;
at least one sensor to detect the position and/or movement of the first handle relative to reference point in each of the four degrees of freedom; and
a circuit receiving the sensor outputs and providing an output signal indicative of the position and/or movement of the at least one handle relative to reference point.

26. The controller of claim 25, further comprising a second handle attached to the mechanical coupling, wherein the reference point is proximate the attachment between the second handle and the mechanical coupling.

27. The controller of claim 25, wherein the mechanical coupling includes a mechanism selected from the group consisting of:
a gimbal;
a constant velocity joint,
a pivot joint,
a universal joint, and
a ball joint.

28. The controller of claim 25, wherein the mechanical coupling comprises a gimbal attached to a telescopic device.

29. The controller of claim 28, wherein a first sensor is configured to measure the pivoting in a first axis of the gimbal relating to the first degree of freedom, a second sensor is configured to measure the pivoting in a second axis of the gimbal relating the second degree of freedom, a third sensor is configured to measure the translating of the telescopic device in the third degree of freedom and a forth sensor is configured to measure the rotation of the telescopic device in the forth degree of freedom.

30. A gaming system comprising
a controller according to claim 1, and
a processor configured to receive an output signal from the controller and provide a video signal depending on the relative position or movement of the first handle.

31. The gaming system of claim 30 further comprising a display configured to display a game depending on the video signal.

* * * * *